(12) United States Patent
Otanez et al.

(10) Patent No.: US 8,489,298 B2
(45) Date of Patent: Jul. 16, 2013

(54) DESIRED TORQUE CONVERTER CLUTCH SLIP FEEDBACK RECOVERY ALGORITHM FOR TIP-IN MANEUVERS

(75) Inventors: Paul G. Otanez, Troy, MI (US); Chunhao J. Lee, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 874 days.

(21) Appl. No.: 12/555,867

(22) Filed: Sep. 9, 2009

(65) Prior Publication Data

US 2011/0060509 A1 Mar. 10, 2011

(51) Int. Cl.
- F16D 43/20 (2006.01)
- F16D 7/00 (2006.01)
- G06F 17/00 (2006.01)

(52) U.S. Cl.
USPC ............. 701/68; 701/67; 701/53; 477/166; 477/174; 477/176

(58) Field of Classification Search
USPC ............ 701/51, 53, 58, 68, 67; 477/174, 477/176, 169, 175, 166, 70; 192/3.51, 3.63
See application file for complete search history.

(56) References Cited

U.S. PATENT DOCUMENTS

| | | | | |
|---|---|---|---|---|
| 5,474,506 A | * | 12/1995 | Palansky et al. | 477/63 |
| 5,527,238 A | * | 6/1996 | Hrovat et al. | 477/166 |
| 5,662,552 A | * | 9/1997 | Fukasawa et al. | 477/169 |
| 7,302,330 B1 | * | 11/2007 | Holtz et al. | 701/51 |
| 7,676,315 B2 | * | 3/2010 | Doering et al. | 701/87 |
| 2008/0312800 A1 | * | 12/2008 | Satou et al. | 701/68 |
| 2009/0149298 A1 | | 6/2009 | Otanez et al. | |
| 2009/0150032 A1 | | 6/2009 | Samie et al. | |
| 2009/0164078 A1 | * | 6/2009 | Oue et al. | 701/67 |

FOREIGN PATENT DOCUMENTS

| CN | 1629519 A | 6/2005 |
|---|---|---|
| GB | 2280733 A | 2/1995 |

OTHER PUBLICATIONS

U.S. Appl. No. 12/651,525, Otanez et al.
U.S. Appl. No. 12/651,529, Otanez et al.
U.S. Appl. No. 13/112,094, Lee et al.

* cited by examiner

*Primary Examiner* — Christine Behncke (57) ABSTRACT

A powertrain includes an engine, a transmission, and a torque converter located between the engine and the transmission. Subsequent to a rapid increase in engine torque commands, torque converter slip is controlled by monitoring a measured torque converter slip after the rapid increase in engine torque commands, determining a maximum measured torque converter slip value resulting from the rapid increase in engine torque commands based upon the measured torque converter slip, determining a target value to which to reduce the torque converter slip, determining a recovery profile to reduce the torque converter slip from the maximum measured torque converter slip to the target value, and utilizing the recovery profile to controllably reduce the torque controller slip. Determining the recovery profile includes commanding reducing slip through the profile at commanded torque converter slip values selected to prevent the torque converter slip from reaching zero.

24 Claims, 4 Drawing Sheets

DESIRED TORQUE CONVERTER CLUTCH SLIP FEEDBACK RECOVERY ALGORITHM FOR TIP-IN MANEUVERS

TECHNICAL FIELD

This disclosure is related to a system and method for setting the slip in a torque converter of a vehicle.

BACKGROUND

The statements in this section merely provide background information related to the present disclosure and may not constitute prior art.

Internal combustion engine vehicles that employ automatic transmissions typically include a torque converter positioned between the engine and the transmission of the vehicle. A torque converter is a fluid coupling device typically including an impeller coupled to an output shaft of the engine and a turbine coupled to the input shaft of the transmission. The torque converter uses hydraulic fluid to transfer rotational energy from the impeller to the turbine.

The rotational speed of the impeller relative to the turbine in the torque converter is typically different so that there is a converter slip therebetween. Because large slips between the engine output and the transmission input significantly affect the fuel economy of the vehicle, some vehicles employ a torque converter clutch (TCC) for controlling or reducing the slip between the engine and the transmission. The TCC can also mechanically lock the impeller at the output of the engine to the turbine at the input of the transmission so that the engine and transmission rotate at the same speed. Locking the impeller to the turbine is generally only used in limited circumstances because of various implications.

Thus, a TCC generally has three modes. A fully locked mode as just described, a fully released mode and a controlled slip mode. When the TCC is fully released, the slip between the impeller and the turbine of the torque converter is only controlled by the hydraulic fluid therebetween. In the slip mode, the slip between the torque converter impeller and turbine is set so that it does not exceed a predetermine amount by controlling the pressure of the hydraulic fluid in the TCC. Rapid changes in throttle request result in rapid changes to engine speed and torque applied to the torque converter. Rapid increases in engine speed and/or torque can result in torque slip changing from a controlled value to an excessive value that must be controlled back to a controlled value.

SUMMARY

A powertrain includes an engine, a transmission, and a torque converter located between the engine and the transmission. Subsequent to a rapid increase in engine torque commands, torque converter slip is controlled by monitoring a measured torque converter slip after the rapid increase in engine torque commands, determining a maximum measured torque converter slip value resulting from the rapid increase in engine torque commands based upon the measured torque converter slip, determining a target value to which to reduce the torque converter slip, determining a recovery profile to reduce the torque converter slip from the maximum measured torque converter slip to the target value, and utilizing the recovery profile to controllably reduce the torque controller slip. Determining the recovery profile includes commanding reducing slip through the profile at commanded torque converter slip values selected to prevent the torque converter slip from reaching zero.

BRIEF DESCRIPTION OF THE DRAWINGS

One or more embodiments will now be described, by way of example, with reference to the accompanying drawings, in which.

DETAILED DESCRIPTION

Figure 1:
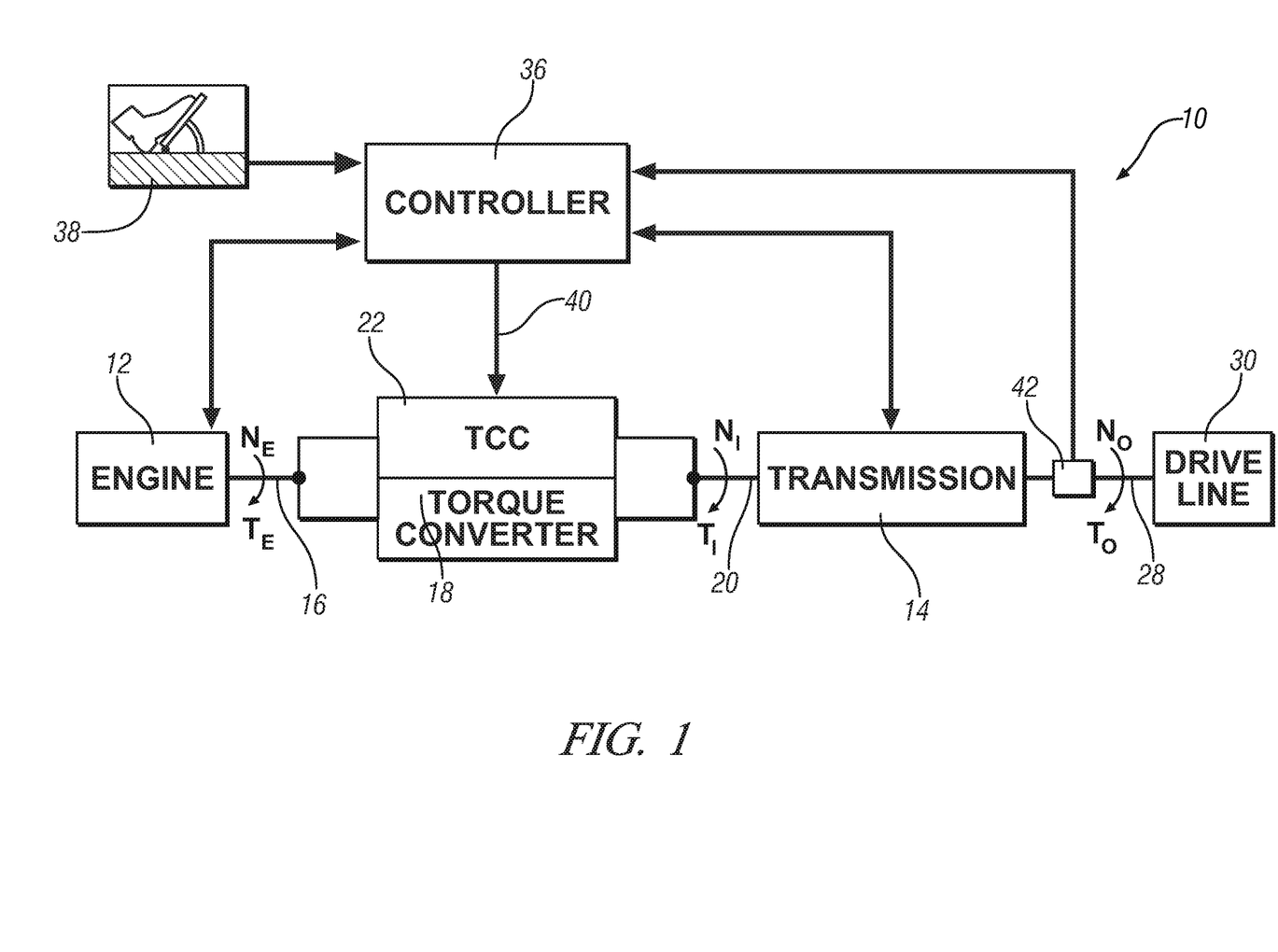
FIG. 1 is a block diagram showing various drive-train components of a vehicle, in accordance with the present disclosure.

Referring now to the drawings, wherein the showings are for the purpose of illustrating certain exemplary embodiments only and not for the purpose of limiting the same, FIG. 1 is a block diagram of various powertrain components of a vehicle 10. The powertrain components include an engine 12 and a transmission 14. An output shaft of the engine 12, represented by line 16, is coupled to one end of a torque converter 18, and an input shaft of the transmission 16, represented by line 20, is coupled to an opposite end of the torque converter 18. As discussed above, the torque converter 18 transfers rotational energy from the engine 12 to the transmission 14 using hydraulic fluid so that the engine 12 can be disengaged from the transmission 14 when necessary. A TCC 22 sets a torque converter slip in the torque converter 18 between the engine 12 and the transmission 14, as discussed above. In this diagram, engine output power is depicted as engine rotational speed $N_E$ measured in revolutions per minute (RPM) and engine torque $T_E$ measured in Newton-/meters. Likewise, the speed of the transmission 14 at its input is represented by transmission input speed $N_I$ and transmission torque $T_I$. The torque slip in the torque converter 18 is defined as $N_E - N_I$. An output shaft of the transmission 14, represented as line 28, is coupled to a driveline 30 of the vehicle 10 that distributes the engine power to the vehicle wheels in a manner that is well understood to those having ordinary skill in the art. The speed of the output shaft 28 of the transmission 14 is represented as $N_O$ and the torque of the output shaft 28 of the transmission 14 is represented at $T_O$.

The vehicle 10 also includes a controller 36 intended to represent both an engine controller and a transmission controller; however, it will be appreciated that these two controlling functions can be served by a single device or a plurality of communicably connected devices. The controller 36 receives a throttle position signal from a vehicle throttle 38, and provides a signal to the engine 12 to provide the necessary engine speed and a signal to the transmission 14 to provide the necessary gear to satisfy the throttle demand. Additionally, depending on the selected engine speed and transmission gear, the controller 36 provides a signal on line 40 to the TCC 22 to set the desired torque converter slip. A sensor 42 measures the output behavior of the transmission 14. In one exemplary embodiment, the sensor 42 measures the rotational speed of the output shaft 28 of the transmission 14 and sends a speed signal to the controller 36. Suitable examples for the sensor include an encoder, speed sensor, accelerometer, torque sensor, etc.

The controller 36, as described above, can describe a single device or a number of devices. The controller is equipped with a microprocessor including a memory storage device and is capable of executing programming to operate methods described herein.

The present disclosure describes an exemplary process for adjusting the torque converter slip in response to changes in engine speed and/or transmission gear and/or engine torque so that the slip is at a desired minimum to conserve fuel, but is not so low where engine pulses and other noise signals are transferred through the torque converter 18 to the driveline 30 and are felt by vehicle occupants. The controller 36 will select the particular slip and transmit it to the TCC 22 on the line 40 for the current engine speed, transmission gear and engine torque based on a pre-populated table that is stored in the controller 36 as a result of vehicle testing or other operations for a minimum torque converter slip that provides good fuel economy and reduced vibration transfer. One process for populating such a table can be found in commonly owned U.S. patent application Ser. No. 12/043,499, titled Aggressive Torque Converter Clutch Slip Control Design Through Driveline Torsional Velocity Measurements, filed Mar. 6, 2008 and incorporated herein by reference. If the selected torque converter slip for a particular engine speed, transmission gear and engine torque does not provide the desired slip for preventing vibrations from being transferred to the driveline 30, then the signal from the sensor 42 is used to determine the vibrations in the controller 36, which can then increase the torque converter slip if the vibrations exceed a predetermined threshold.

Torque converter slip is controlled by application of the TCC. The TCC includes structures mechanically, electronically, or fluidically operated to controllably couple the impeller and turbine of the torque converter, modulating an allowed slip therebetween. When the TCC is fully released, the fluidic interaction between the impeller and the turbine control slip. When the TCC is fully locked, no slip between the impeller and turbine are possible. In one exemplary control method, the TCC controls the pressure of hydraulic fluid in the torque converter so that the torque converter slip approaches a desired value. By reducing the pressure of the hydraulic fluid in the torque converter, torque converter slip for a given operating condition will increase. Similarly, by increasing the pressure of the hydraulic fluid in the torque converter, torque converter slip for a given operating condition will decrease.

Methods of feedback control are known in the art. Such methods monitor a desired value, control an output according to the desired value, and utilize a resulting value of the controlled output to subsequently improve control to the desired value. Feedback control is known to control slip in a torque converter through variable control of a TCC. A desired torque converter slip can be monitored, a pressure command to the TCC can be modulated in order to control resulting torque converter slip, and the resulting torque converter slip can be used in a feedback loop to subsequently modulate the pressure command to the TCC. In this way, feedback control can be utilized to control torque converter slip to a desired value. The desired value can be a steady state term, substantially unchanging through a time period, or the desired value can be transitory, for example, increasing or decreasing through a period or changing according to a step profile.

As described above, rapid increases in engine speed and/or torque can result in torque slip changing from a controlled value to an excessive value that must be controlled back to a controlled value. Such rapid changes in torque can result from throttle demands by the operator. Similarly, such changes can result from automatically generated commands, for example, in connection with cruise control functions or transmission shifts. Any rapid or sudden change in engine torque includes the potential to create a corresponding increase in torque converter slip. By monitoring engine torque commands or factors indicative of rapid increases in engine torque, methods can be employed to compensate for anticipated increased slip.

A tip-in throttle demand describes a rapid increase in throttle demand or output torque request by the operator. While, as described above, increases in engine torque can originate from a number of sources, for simplicity, the remainder of the disclosure will discuss such changes as tip-in throttle demands or tip-in events. However, one having ordinary skill in the art will appreciate that the disclosure can apply equally well to other similar commanded changes to engine torque.

One method to indicate a tip-in throttle demand includes measuring a throttle position sensor output (TPS) and determining whether a rate of change in TPS exceeds a threshold rate of change in TPS. Rate of change in TPS can be calculated in a number of ways, for example, through direct numerical differentiation, operation of Kalman Filter, or other methods known in the art. This threshold rate of change in TPS can be selected by a number of methods to indicate a rapid increase in throttle demand, such as by calibration or modeling sufficient to describe torque converter slip response to a change in TPS.

Monitoring TPS is one method to identify a rapid increase in engine torque. Other methods are disclosed, including directly monitoring engine torque, monitoring an air flow mass sensor to estimate engine torque through changes to input air flow, monitoring fuel mass injected into the engine to similarly estimate engine torque through changes in fuel mass injected, and monitoring signals normally sent from the engine to the transmission describing changes in engine torque.

While torque converter slip can be controlled to some small value in steady state operation, rapid and significant increases in $N_E$ and $T_E$ consistent with tip-in throttle demands are known to result in rapid increases in torque converter slip. Excess slip reduces fuel efficiency of the powertrain and torque output to the output shaft and must be reduced in a timely method. Further, feedback control of torque converter slip, described above, responding to a rapid change in torque converter slip, can result in unpredictable changes to the torque converter slip, for example, feedback induced increases in TCC pressure commands resulting in the slip quickly being reduced to zero. Rapidly changing slip resulting in zero slip can result in perceptible and undesirable effects to drivability.

Methods are known to reestablish control over torque converter slip after a tip-in throttle demand. However, the resulting rapid decrease in torque converter slip through known methods to reestablish control over torque converter slip frequently drive the torque converter slip to zero, resulting in adverse impacts to drivability, as described above. A method is disclosed to react to rapid increases in torque converter slip associated with a tip-in throttle demand by reducing torque converter slip according to a recovery profile defined by the measured torque converter slip at a maximum value to a desired torque converter slip value defined by the steady state torque converter slip controlled prior to the initiation of the tip-in throttle demand.

Commands to the TCC can be modulated during a tip-in throttle demand in order to avoid undesirable results in the torque converter. In one embodiment, in order to avoid the feedback control normally in operation to control slip creating unpredictable changes to slip during a tip-in transition, upon detection of a tip-in throttle demand, a feedback portion of pressure control to the TCC based upon the difference between desired and measured slip is initially frozen during the tip-in throttle demand until the operation of the recovery profile described above. Such an exemplary system can include a pressure control term described by the following equation.

$$TCC\, pressure\, command = feedback\_term + feed\_forward\_term \quad [1]$$

The feed forward term can be based upon many different factors affecting torque applied through the torque converter. In one exemplary embodiment, the feed forward term is based upon engine torque, with the feed forward term increasing with increasing engine torque. A feed forward term changing roughly proportionally to engine torque would increase in a tip-in event, but because the feed forward term is responsive to engine torque, the increases to each are proportional. As a result, the increase to the feed forward term would be unlikely to cause unpredictable or jerky motion in the torque converter. It will be appreciated that a feedback term based upon a difference between desired slip and measured slip, in response to a large increase in slip resulting from a tip-in transition, would drive a sharp increase in pressure command to the TCC. This sharp increase in the feedback term lags the increase in slip. Likewise, if the feedback term causes the TCC to clamp down strongly to reduce measured slip, the reduction of the feedback term would also lag a reduction in measured slip. As a result, this feedback term could cause unpredictable or jerky motion in the torque converter, for example, resulting in a crash to zero slip in the torque converter. As a result, a method is disclosed to freeze the slip-based feedback pressure command term at the detection of a tip-in transition, while maintaining the feed forward term through the tip-in transition.

Figure 2:
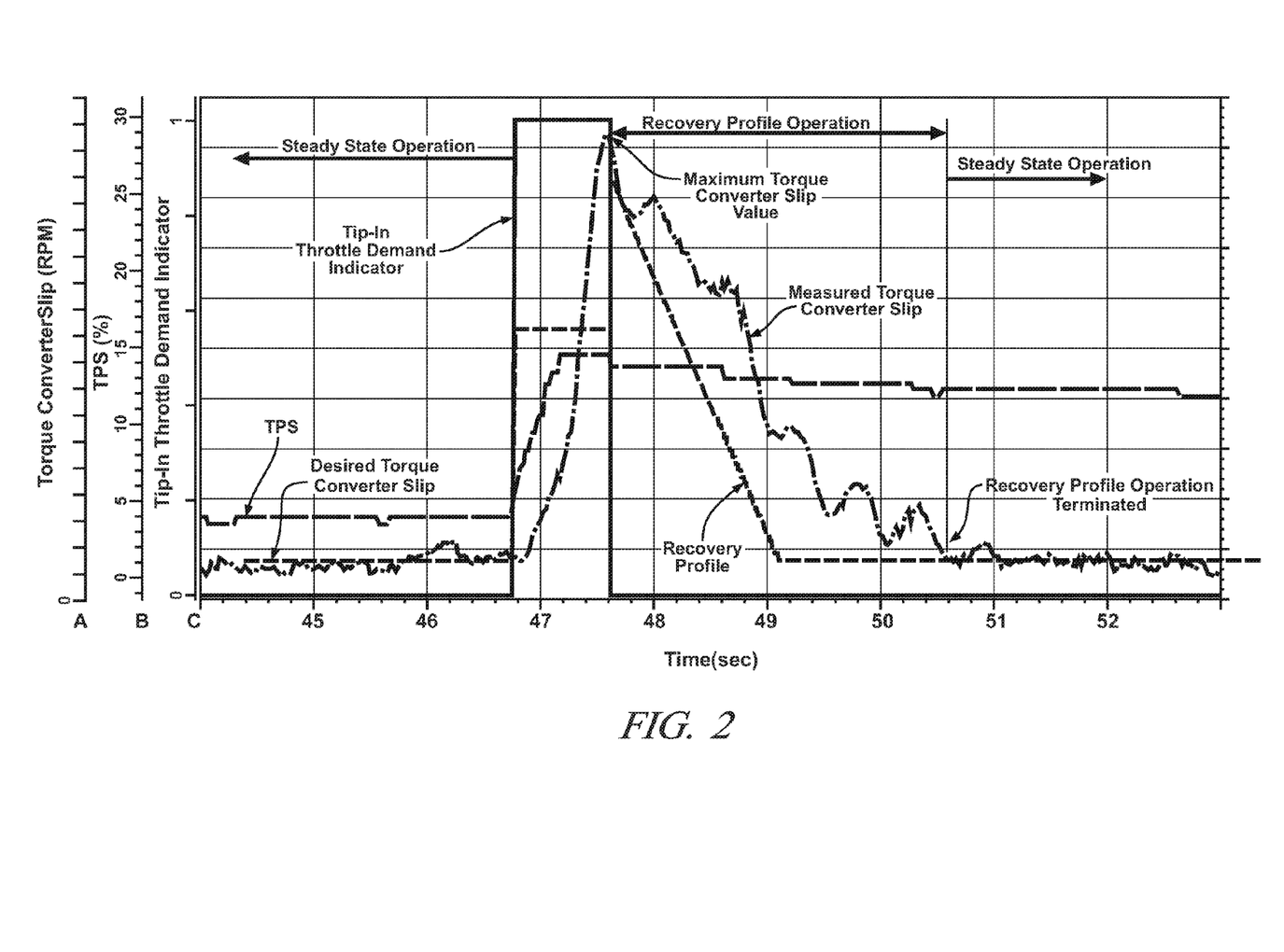
FIG. 2 depicts a graphical representation of an exemplary embodiment of a method to control torque converter slip after a tip-in torque demand while preventing torque converter slip from being reduced to zero, in accordance with the present disclosure.

FIG. 2 is a graphical representation of an exemplary embodiment of a method to control torque converter slip after a tip-in torque demand while preventing torque converter slip from being reduced to zero, in accordance with the present disclosure. The depicted graph illustrates a number of test parameters versus a common timescale through a test period. At the outset of the test, illustrated in the left portion of the graph, a desired torque converter slip value is described as a fixed or steady value, set according to methods such as the exemplary methods described above. Measured torque converter slip is described, for example, measured as a difference between $N_E$ and $N_I$. A measured TPS is additionally depicted, for example, describing an accelerator pedal position or measure of pedal depression by the operator. Finally, a binary tip-in throttle demand indicator is depicted, describing an indication whether a tip-in throttle demand has been detected. In this first portion of the graph, the powertrain can be said to be operating at substantially steady state, and the measured torque converter slip can be utilized according to methods described herein to control slip to the desired torque converter slip.

In the middle portion of the graph, starting at a time measurement of approximately 46.7 seconds, TPS increases sharply. This change in TPS indicates a sharp and sudden increase in throttle demand by the operator, and analysis of the TPS allows a change in the tip-in throttle demand indicator. The sharp increase in throttle demand results in a sharp increase in $N_E$ and $T_E$ (not depicted), resulting in a sharp increase in measured torque converter slip as depicted in the graph. This increase in slip is frequently unavoidable. Although the TCC control system reacts to a tip-in by increasing the TCC commanded hydraulic pressure, the TCC hydraulic system response is not fast enough to react to a rapid change of engine torque, thereby causing a large gap between the commanded TCC pressure and the resulting TCC pressure. Sharp increases in throttle demand have a limit, and eventually the throttle demand and the resulting engine output stabilize or reduce. This also allows for the TCC hydraulic pressure to stabilize, thereby reducing the TCC slip. As a result, a peak or maximum torque converter slip value is measured and can be identified based upon subsequent changes in the maximum torque converter slip.

A method to controllably reduce the torque converter slip to a desired torque converter slip can be described by comparing and controlling the measured torque converter slip to a recovery profile. The recovery profile includes commanded torque converter slip values and is set to quickly reduce torque converter slip, so as to avoid the reduction in fuel efficiency and corresponding loss of power to the output shaft associated with significant torque converter slip. However, the recovery profile is also set to not reduce the torque converter slip too quickly, so as to avoid drivability issues that would result from impulsive changes to $N_I$ and $T_I$. Additionally, the recovery profile is set to recover the torque converter slip to a target value or a new desired torque converter slip value similar to the desired torque converter slip set during the last steady state operation prior to the tip-in throttle demand. Additionally, the recovery profile is set to recover the torque converter slip to the new desired torque converter slip in a controllable manner so as to avoid overshoot of the new desired torque converter slip, ensuring that torque converter slip does not reach zero.

Referring again to FIG. 2, the above described method to utilize a recovery profile is exemplified. As described above, the measured torque converter slip increases sharply in response to the increase in throttle demand indicated by the tip-in throttle demand indication. Once the TPS levels off, the measured torque converter slip peaks and begins to reduce. The exemplary method utilized in FIG. 2 utilizes this peak to define an initial value for the recovery profile at or near the peak measured torque converter slip value. Once this initial value is set, a target value to which to reduce slip must be selected. According to one method, a desired torque converter slip value from just before the tip-in throttle demand was initiated can be used as a target value. Other target values are envisioned, for example, including a time-averaged value of desired torque converter slip before the tip-in throttle demand, a set calibrated torque converter slip value, for example, available in a look-up table based upon engine load and transmission gear, or a historical desired torque converter slip value multiplied by some safety factor, wherein that safety factor can later be switched or phased out to normally controlled steady state torque converter slip values described above. In addition to selecting a target torque converter slip value, a transition from the initial value of the recovery profile to the target torque converter slip value must be plotted. A number of transitions defining the recovery profile between the initial value of the recovery profile to the target torque converter slip value are envisioned. Preferred transitions for the recovery profile quickly control the torque converter slip to the target value with no effect to drivability in form of jerky torque pulses and avoiding the toque converter slip overshooting the target value to zero slip. As depicted in FIG. 2, an exemplary transition is illustrated as a linear transition between the initial value of the recovery profile to the target torque converter slip value defined by a set transition time, in this example, 1.5 seconds. One having ordinary skill in the art will appreciate that this is an exemplary transition time for the particular hardware configuration operating at a set of particular conditions. Selection of a set transition time can be achieved by any method sufficient to predict torque converter operation through a slip reduction period. Other methods to set a linear or nearly linear transition are envisioned, including setting the slope of the recovery profile through the transition according to a desired slip per unit time measure or limiting a recovery profile to a maximum slope. An example of a method limited the recovery profile to a maximum slope includes determining a provisional set transition time, determining a resulting slope of a recovery profile based upon the provisional set transition time, comparing the resulting slope to a maximum slope, and selecting a set transition time based upon extending the provisional set transition time if the resulting slope is greater than the maximum slope. Other profile shapes besides linear are envisioned including any mathematical expression transitioning from the initial value to the target value, for example including a second, third, or higher order function, defined, for example, by a corresponding quadratic equation, to transition within the recovery profile. Similarly, an exponential decay can be utilized to transition from the initial value to the target value. The profile shape can be utilized based upon such shapes or equations, and the profile shape can include further data manipulation methods known in the art. For example, a Kalman filter, a lag filter, or a similar averaging method can be used to smooth the shape of the profile. Similarly, splines can be utilized by methods known in the art to construct the resulting profile. Any similar methods known in the art can be utilized to select the mathematical expression for the transition or to manipulate the resulting shape of the profile, and the disclosure is not intended to be limited to the particular embodiments described herein.

As depicted in FIG. 2, the measured torque converter slip may lag the commanded slip of the recovery profile. One having ordinary skill in the art will appreciate that control of torque converter slip can be controlled by feedback control, feed forward control, or other similar control methods. If the control system is designed, tuned, or calibrated to allow such lag it can be factored into the selected recovery profile according to methods known in the art.

Lag between the commanded torque converter slip values and measured or resulting torque converter slip values, when present, result from the response of the torque converter, the torque converter clutch, and the rest of the related hardware to changing commands. This response must be taken into account when determining the recovery profile. One having ordinary skill in the art will appreciate that systems responding to a change in input, when the response is too fast, tend to overshoot the target value. However, responses that are too slow incur unnecessary delays upon the system. Through calibration, modeling, or other means of analyzing the system, one may determine appropriate or preferred system response times based upon factors affecting the performance of the system. Applied to the current torque converter slip disclosure, by analyzing the response of the measured torque converter slip values to the commanded torque converter slip values and by analyzing the effects of factors affecting the response, such as engine load and transmission gear, a recovery profile can be selected to quickly reduce torque converter slip while avoiding overshoot risking the slip reducing to zero. This analysis can be performed experimentally, empirically, predictively, through modeling or other techniques adequate to accurately predict powertrain operation, and a multitude of calibration curves might be developed by the same powertrain for different settings, conditions, or operating ranges.

As depicted in FIG. 2, the measured torque converter slip responds to the downward sloping commanded torque converter slip in the recovery profile. This response in the measured torque converter slip is controlled by a feedback closed-loop control based upon the recovery profile and the resulting measured torque converter slip values. Once the recovery profile reaches the target value, the commanded torque converter slip equals the target value as a horizontal line. Depending upon the lag of the measured torque converter slip to the recovery profile, the measured torque converter slip can still exceed the target value by a significant amount and the potential for overshoot of the target value can still exist, particularly if steady state control is immediately restored and the commanded torque converter slip is allowed to vary according to normal control methods. It can be beneficial to maintain the commanded torque converter slip values at the target value for some period, thereby allowing the measured torque converter slip values to reduce in a controlled profile until normal methods of control can be restored. Such a maintaining of the target value is described in FIG. 2, wherein a recovery profile operation period is described to not only include the period of the downward sloping recovery profile but also a period terminating when the measured torque converter slip value equals the target value. Once the recovery profile operation period is terminated, the recovery profile can be terminated and methods related to steady state control can be again utilized to control torque converter slip without abnormal risk of the slip reducing to zero. Other exemplary methods to terminate the recovery profile operation period include monitoring the measured torque converter slip achieving a value within a certain percentage of the target value or remaining within a certain percentage of the target value for time period.

Figure 3:
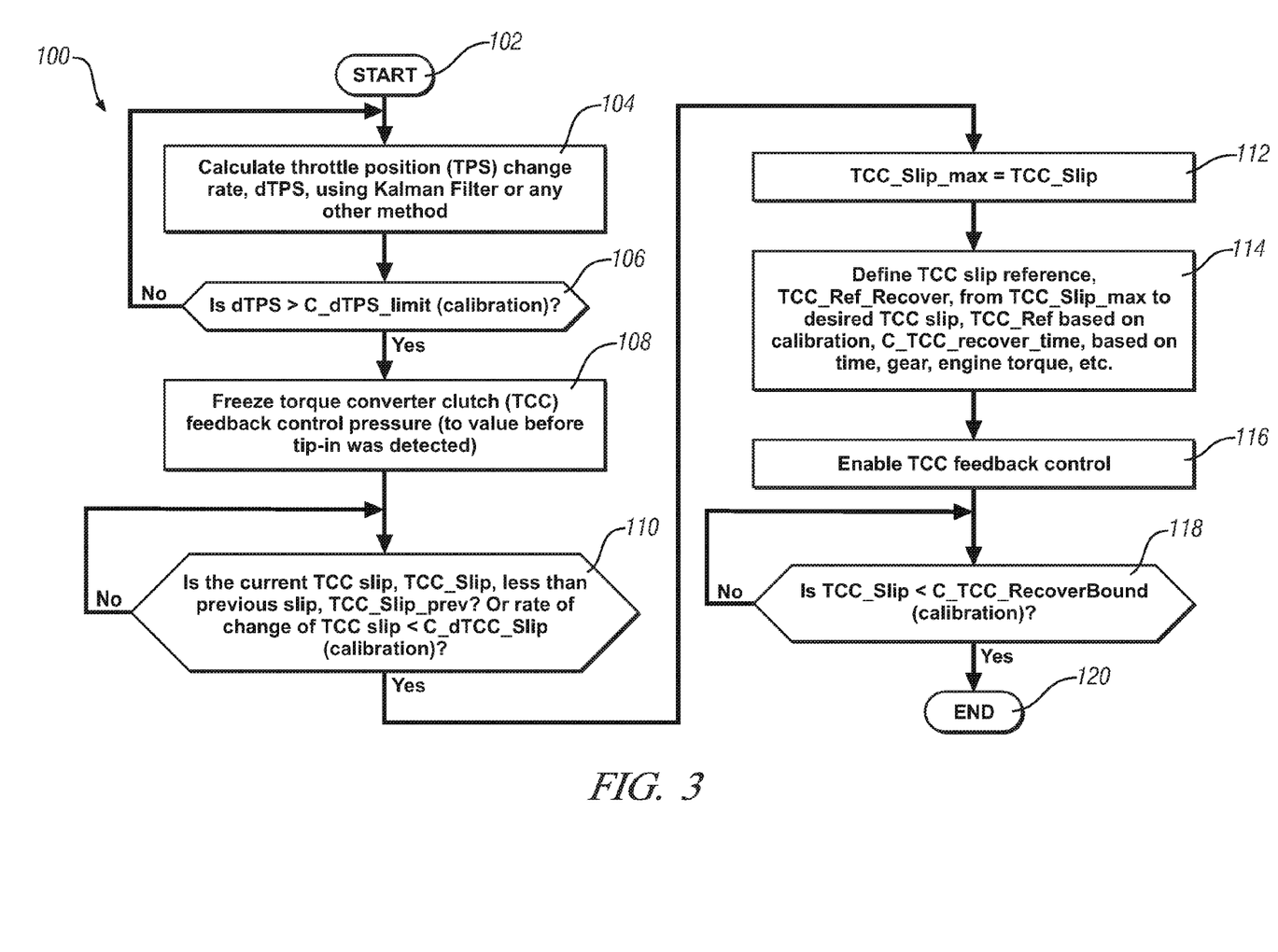
FIG. 3 illustrates an exemplary process whereby a recovery profile can be implemented to control torque converter slip, in accordance with the present disclosure.

FIG. 3 illustrates an exemplary process whereby a recovery profile can be implemented to control torque converter slip, in accordance with the present disclosure. Process 100 is depicted including a plurality of steps and decisions to control torque converter slip. Process 100 starts at 102. At 104, a monitored TPS is analyzed to determine a range of change of TPS, using a Kalman filter or other similar methods known in the art. At 106, a comparison is made of the change in TPS to a calibrated threshold change in TPS, and if the change in TPS is greater than the threshold, then a tip-in throttle demand is determined, and the process advances to 108. If the change in TPS is not greater than the threshold, then the process returns to 104 to continue monitoring the TPS. At 108, a torque converter clutch feedback control pressure is set at the current value equal to the value from just before the tip-in throttle demand was detected. This is done to prevent the TCC feedback (closed loop) control system from increasing the TCC hydraulic pressure as a response to the sudden increase in TCC measured slip. It should be noted that at this time in the process, a tip-in throttle demand has been detected, and as described in FIG. 2, the torque converter slip is likely to be quickly accelerating corresponding to rapid increases in $N_E$ and $T_E$. 110 monitors the measured torque converter slip, analyzing current slip versus a previous slip measurement or analyzing a rate of change in slip, to judge when a maximum torque converter slip value has been reached. When 110 determines the maximum slip value has been reached, the process advances top 112 wherein the maximum slip value is designated. At 114, the recovery profile is determined based upon the designated maximum slip value, a desired torque converter slip value (the target value described above), a selected profile shape, and a recovery time or set transition time. In this exemplary embodiment, the set transition time is available based factors describing the transition to be accomplished, for example including transmission gear and engine torque. Such a variable-based set transition time can be made available through a look-up table, a variable based function, or through modeling. Such variable relationships can be developed experimentally, empirically, predictively, through modeling or other techniques adequate to accurately predict powertrain operation, and a multitude of set transition times or relationships might be used for different conditions or operating ranges. At 116, feedback control of the torque converter to modulate clutch slip according to methods known in the art is enabled. At 118, measured torque converter slip is compared to a threshold value used to determine a completed recovery to a desired torque converter slip. When the comparing indicates that the slip has recovered adequately, the process ends at 120.

Figure 4:
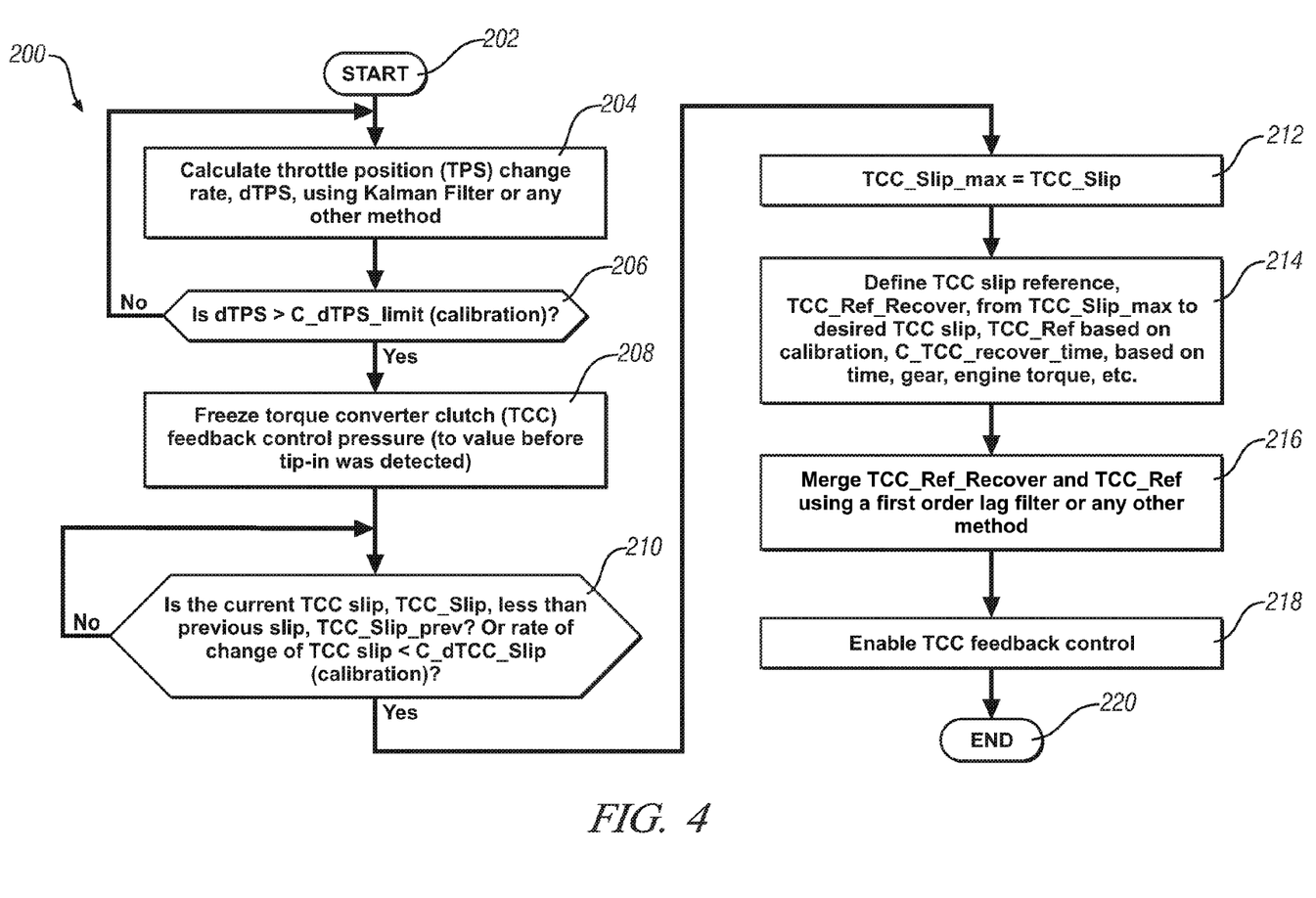
FIG. 4 illustrates an additional exemplary process whereby a recovery profile can be implemented to control torque converter slip, in accordance with the present disclosure.

FIG. 4 illustrates an additional exemplary process whereby a recovery profile can be implemented to control torque converter slip, in accordance with the present disclosure. Process 200 is depicted including a plurality of steps and decisions to control torque converter slip. Process 200 includes 202 through 214 that are substantially identical to 102 through 114, described above. Process 200 differs at 216, wherein terms defining the recovery profile are merged using a first order lag filter, thereby smoothing the recovery profile and the resulting controlled changes to torque converter slip. At 218, feedback control of the torque converter to modulate clutch slip according to methods known in the art is enabled. At 220, the process ends.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control torque converter slip in a powertrain after a rapid increase in an engine torque command, the powertrain including an engine, a transmission, and a torque converter located between the engine and the transmission, the method comprising:
   monitoring a measured torque converter slip after the rapid increase in the engine torque command;
   determining a maximum measured torque converter slip resulting from the rapid increase in the engine torque command based upon the measured torque converter slip;
   determining a target value to which to reduce the torque converter slip;
   determining a recovery profile to reduce the torque converter slip from the maximum measured torque converter slip to the target value; and
   utilizing the recovery profile to controllably reduce the torque controller slip;
   wherein determining the recovery profile to reduce the torque converter slip from the maximum measured torque converter slip to the target value comprises commanding reducing said torque converter slip at commanded torque converter slip values selected to prevent the torque converter from reaching a zero slip condition.

2. The method of claim 1, wherein the rapid increase in the engine torque command is a tip-in throttle demand.

3. The method of claim 1, wherein determining the target value to which to reduce the torque converter slip comprises:
   monitoring a desired torque converter slip before the rapid increase in the engine torque command; and
   setting the target value to the last desired torque converter slip value monitored prior to the rapid increase in the engine torque command.

4. The method of claim 1, further comprising:
   monitoring a throttle position sensor;
   determining a rate of change of the throttle position sensor;
   comparing the rate of change of the throttle position sensor to a threshold rate of change; and
   indicating the rapid increase in the engine torque command based upon the rate of change of the throttle position sensor exceeding the threshold rate of change.

5. The method of claim 1, wherein determining the recovery profile to reduce the torque converter slip comprises:
   utilizing a mathematical expression to reduce the torque converter slip.

6. The method of claim 5, wherein the mathematical expression comprises:
   utilizing a linear reduction in commanded torque converter slip to reduce the torque converter slip to the target value.

7. The method of claim 5, wherein the mathematical expression comprises:
   utilizing an exponential decay in commanded torque converter slip to reduce the torque converter slip to the target value.

8. The method of claim 5, wherein the mathematical expression comprises:
   utilizing a quadratic equation in commanded torque converter slip to reduce the torque converter slip to the target value.

9. The method of claim 5, wherein utilizing the mathematical expression comprises:
   utilizing a filter to smooth the determined recovery profile.

10. The method of claim 5, wherein utilizing the mathematical expression comprises:
    utilizing splines to shape the determined recovery profile.

11. The method of claim 1, wherein determining the recovery profile to reduce the torque converter slip comprises:
    defining the recovery profile based upon a set transition time starting at the time the maximum measured torque converter slip value is determined and ending with the recovery profile reaching the target value.

12. The method of claim 11, further comprising:
    monitoring an engine load; and
    monitoring a transmission gear; and
    wherein the set transition time is selected based upon the monitored engine load and the monitored transmission gear.

13. The method of claim 11, further comprising:
    monitoring an engine load; and
    monitoring a transmission gear; and
    wherein the set transition time is selected by
    determining a provisional set transition time based upon the monitored engine load and the monitored transmission gear,
    determining a resulting slope of a provisional recovery profile based upon the provisional set transition time,
    comparing the resulting slope to a maximum slope, and
    selecting the set transition time based upon extending the provisional set transition time if the resulting slope is greater than the maximum slope.

14. The method of claim 1, wherein determining the recovery profile to reduce the torque converter slip comprises:
    defining the recovery profile based upon a desired slip per unit time measure.

15. The method of claim 1, further comprising:
after the rapid increase in the engine torque command, freezing a slip-based feedback pressure command to a torque converter clutch until the recovery profile is utilized.

16. Method to control torque converter slip in a powertrain including an engine, a transmission, and a torque converter located between the engine and the transmission, the method comprising:
monitoring a throttle position sensor;
detecting a tip-in throttle demand based upon the monitored throttle position sensor;
monitoring a measured torque converter slip after the detected tip-in throttle demand;
temporarily freezing a pressure command to a torque converter clutch after the tip-in throttle demand;
determining a maximum measured torque converter slip value resulting from the tip-in throttle demand based upon the measured torque converter slip;
determining a target value for the torque converter slip comprising a desired torque converter slip measured before the tip-in throttle demand;
determining a recovery profile to reduce the torque converter slip from the maximum measured torque converter slip to the target value;
unfreezing the pressure command to the torque converter clutch; and
utilizing the recovery profile to controllably reduce the torque controller slip; and
wherein determining the recovery profile to reduce the torque converter slip from the maximum measured torque converter slip to the target value comprises reducing the torque converter slip through the profile at a rate of change in slip per unit time selected to prevent the torque converter slip from overshooting and reaching a zero slip condition.

17. Apparatus to control torque converter slip in a powertrain after a tip-in throttle demand, the powertrain including an engine, a transmission, and a torque converter located between the engine and the transmission, the apparatus comprising:
the torque converter;
a torque converter clutch controlling a torque converter slip;
a sensor monitoring for a tip-in throttle demand;
a controller
monitoring the sensor,
indicating the tip-in throttle demand based upon the sensor monitoring,
monitoring a measured torque converter slip,
determining a maximum measured torque converter slip resulting from the tip-in throttle demand based upon the measured torque converter slip,
determining a target value for the torque converter slip,
determining a recovery profile to reduce the torque converter slip from the maximum measured torque converter slip to the target value, and
utilizing the recovery profile to controllably reduce the torque controller slip; and
wherein the torque converter clutch controls slip reduction within the torque converter; and
wherein determining the recovery profile to reduce the torque converter slip from the maximum measured torque converter slip to the target value comprises commanding reducing said torque converter slip through the profile at slip rates selected to prevent the torque converter from reaching a zero slip condition.

18. The apparatus of claim 17, wherein the sensor monitoring for the tip-in throttle demand comprises a throttle position sensor providing data to describe a change in throttle demand.

19. The apparatus of claim 17, wherein the sensor monitoring for the tip-in throttle demand comprises an engine torque sensor providing data to describe a change in engine torque.

20. The apparatus of claim 17, wherein the sensor monitoring for the tip-in throttle demand comprises an air mass flow sensor providing data to describe a change in input air flow.

21. The apparatus of claim 17, wherein the sensor monitoring for the tip-in throttle demand comprises a fuel flow sensor providing data to describe a change in a rate of injected fuel.

22. The apparatus of claim 17, wherein the controller further monitors a desired torque converter slip before the tip-in throttle demand, and wherein determining the target value for the torque converter slip comprises setting the target value to an average value of the desired torque converter slip monitored in a period immediately prior to the indication of the tip-in throttle demand.

23. The apparatus of claim 17, wherein utilizing the recovery profile to controllably reduce the torque converter slip comprises programming to command the torque converter clutch.

24. The apparatus of claim 17, wherein the controller further:
monitors an engine load;
determines a feed forward pressure command based upon the engine load;
monitors a desired torque converter slip;
determines a difference between the measured torque converter slip and the desired torque converter slip;
determine a feedback pressure command based upon the difference;
upon indication of the tip-in throttle demand, freeze the feedback pressure command; and
until the utilization of the recovery profile, commands the torque converter clutch based upon the feed forward pressure command and the frozen feedback pressure command.

* * * * *